(12) United States Patent
Liu

(10) Patent No.: US 10,498,421 B2
(45) Date of Patent: Dec. 3, 2019

(54) UPLINK TRANSMISSION CONTROL METHOD AND APPARATUS

(71) Applicant: Huawei Technologies Co., Ltd., Shenzhen (CN)

(72) Inventor: Yalin Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 184 days.

(21) Appl. No.: 15/638,071

(22) Filed: Jun. 29, 2017

(65) Prior Publication Data

US 2017/0302350 A1   Oct. 19, 2017

Related U.S. Application Data

(63) Continuation of application No. PCT/CN2014/095336, filed on Dec. 29, 2014.

(51) Int. Cl.
*H04B 7/06* (2006.01)
*H04W 16/32* (2009.01)
(Continued)

(52) U.S. Cl.
CPC ........... *H04B 7/0619* (2013.01); *H04L 5/003* (2013.01); *H04L 5/0048* (2013.01); *H04W 16/00* (2013.01);
(Continued)

(58) Field of Classification Search
CPC .. H04B 7/0619; H04B 7/0621; H04B 7/0632; H04L 5/003; H04L 5/0048;
(Continued)

(56) References Cited

U.S. PATENT DOCUMENTS

2008/0298275 A1   12/2008   De Sousa
2010/0254344 A1   10/2010   Wei et al.
(Continued)

FOREIGN PATENT DOCUMENTS

CN   102084699 A   6/2011
CN   102131200 A   7/2011
(Continued)

OTHER PUBLICATIONS

Elshaer et al.,"Downlink and Uplink Decoupling: a Disruptive Architectural Design for 5G Networks", 2014 IEEE Global Communications Conference (GLOBECOM), Institute of Electrical and Electronics Engineers, New York, New York (2014).
(Continued)

*Primary Examiner* — Paul H Masur
(74) *Attorney, Agent, or Firm* — Leydig, Voit & Mayer, Ltd.

(57) ABSTRACT

Embodiments of this application provide an uplink transmission control method and an apparatus. A micro base station sends an uplink resource configuration request to a macro base station, the macro base station sends, to the micro base station, an uplink resource configuration indication that is used to allocate an uplink resource to the micro base station, and then the micro base station instructs user equipment to transmit uplink information by using the uplink resource. It can be seen that, after the macro base station allocates the uplink resource to the micro base station, the micro base station may use the uplink resource to receive the uplink information transmitted by the user equipment.

18 Claims, 4 Drawing Sheets

(51) Int. Cl.
*H04W 16/00* (2009.01)
*H04L 5/00* (2006.01)
*H04W 24/02* (2009.01)
*H04W 84/02* (2009.01)

(52) U.S. Cl.
CPC .......... *H04W 16/32* (2013.01); *H04B 7/0621* (2013.01); *H04B 7/0632* (2013.01); *H04W 24/02* (2013.01); *H04W 84/02* (2013.01)

(58) Field of Classification Search
CPC ......... H04W 72/0406; H04W 72/0413; H04W 16/00; H04W 16/32; H04W 24/02; H04W 84/02
See application file for complete search history.

(56) References Cited

U.S. PATENT DOCUMENTS

| | | | |
|---|---|---|---|
| 2011/0053604 A1 | 3/2011 | Kim et al. | |
| 2011/0116481 A1 | 5/2011 | Wang | |
| 2011/0207493 A1* | 8/2011 | Taoka | H04L 5/0028 455/509 |
| 2013/0272170 A1* | 10/2013 | Chatterjee | H04W 28/02 370/280 |
| 2013/0336270 A1 | 12/2013 | Nagata et al. | |
| 2014/0153535 A1 | 6/2014 | Lei et al. | |
| 2014/0192638 A1 | 7/2014 | Taneja | |
| 2014/0198716 A1* | 7/2014 | Speight | H04W 72/0413 370/315 |
| 2015/0365831 A1 | 12/2015 | Ko et al. | |
| 2016/0029401 A1 | 1/2016 | Fukuta et al. | |
| 2016/0234713 A1* | 8/2016 | Lin | H04W 72/042 |

FOREIGN PATENT DOCUMENTS

| | | |
|---|---|---|
| CN | 103763777 A | 4/2014 |
| JP | 2012523186 A | 9/2012 |
| JP | 2013085247 A | 5/2013 |
| JP | 2014204346 A | 10/2014 |
| KR | 20140090958 A | 7/2014 |
| KR | 20140139665 A | 12/2014 |
| WO | 2014109580 A2 | 7/2014 |

OTHER PUBLICATIONS

3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12), pp. 1-68, 3GPP TR 36.842 V1.0.0, 3rd Generation Partnership Project—Valbonne, France (Nov. 2013).

"Physical layer impact of dual connectivity," 3GPP TSG RAN WG1 Meeting #74, R1-133558, Barcelona, Spain, pp. 1-3, 3rd Generation Partnership Project—Valbonne, France (Aug. 19-23, 2013).

* cited by examiner

UPLINK TRANSMISSION CONTROL METHOD AND APPARATUS

CROSS-REFERENCE TO RELATED APPLICATIONS

This application is a continuation of International Application No. PCT/CN2014/095336, filed on Dec. 29, 2014, the disclosure of which is hereby incorporated by reference in its entirety.

TECHNICAL FIELD

This application relates to the communications field, and in particular, to an uplink transmission control method and an apparatus.

BACKGROUND

With development of wireless technologies, in future wireless communications, a communications technology in which uplink transmission and downlink transmission are separated may emerge. However, separation between the uplink transmission and the downlink transmission may cause an increase in a downlink feedback delay.

For example, a high frequency base station performs downlink transmission, a macro base station receives feedback information of the downlink transmission sent by user equipment, and the macro base station sends the feedback information to the high frequency base station. Because the feedback information is forwarded by the macro base station, a delay in receiving the feedback information by the high frequency base station increases. This results in a decrease in a throughput over an air interface.

SUMMARY

Embodiments of this application provide an uplink transmission control method to resolve a problem that a throughput over an air interface decreases due to a feedback information delay when uplink transmission and downlink transmission are separated.

To achieve the foregoing objective, the embodiments of the present invention provide the following technical solutions.

A first aspect of this application provides a micro base station, including:

a first transmitter, configured to send an uplink resource configuration request to a macro base station;

a first receiver, configured to receive an uplink resource configuration indication sent by the macro base station, where the uplink resource configuration indication is used to allocate an uplink resource to the micro base station; and a second transmitter, configured to instruct user equipment to transmit uplink information by using the uplink resource.

In a first implementation of the first aspect of this application, that a second transmitter is configured to instruct user equipment to transmit uplink information by using the uplink resource includes:

the second transmitter is specifically configured to send downlink information to the user equipment, where the downlink information carries indication information of the uplink resource.

In a second implementation of the first aspect of this application, that the second transmitter is specifically configured to send downlink information to the user equipment, where the downlink information carries indication information of the uplink resource includes:

the second transmitter is specifically configured to send the downlink information to the user equipment, where the downlink information carries the indication information of the uplink resource, the indication information of the uplink resource includes a MAC layer command, the MAC layer command carries time-frequency information of the uplink resource and a type of the uplink information, and the type of the uplink information includes a hybrid automatic repeat request HARQ feedback, a channel quality indicator CQI, or a precoding matrix index PMI.

In a third implementation of the first aspect of this application, that a second transmitter is configured to instruct user equipment to transmit uplink information by using the uplink resource includes:

the second transmitter is specifically configured to broadcast indication information of the uplink resource to the user equipment.

In a fourth implementation of the first aspect of this application, that the second transmitter is specifically configured to broadcast indication information of the uplink resource to the user equipment includes:

the second transmitter is specifically configured to broadcast the indication information of the uplink resource to the user equipment, where the indication information of the uplink resource includes a MAC layer command, the MAC layer command carries video information of the uplink resource and a type of the uplink information, and the type of the uplink information includes: a HARQ feedback, a CQI, or a PMI.

In a fifth implementation of the first aspect of this application, the first transmitter is further configured to:

after the user equipment is instructed to transmit the uplink information by using the uplink resource, send an uplink information quality parameter to the macro base station when it is determined that quality of the uplink information transmitted by the user equipment is poor, so that the macro base station reallocates an uplink resource to the micro base station; and the first receiver is further configured to receive an uplink resource change message sent by the macro base station.

In a sixth implementation of the first aspect of this application, the first transmitter is further configured to: send an uplink resource configuration acknowledgement message to the macro base station after the uplink resource configuration indication sent by the macro base station is received; and send an uplink resource configuration change acknowledgement message to the macro base station after the uplink resource change message sent by the macro base station is received.

In a seventh implementation of the first aspect of this application, the micro base station further includes:

a first processor, configured to allocate the uplink resource to each user equipment if there are multiple user equipments, where that the second transmitter is configured to instruct user equipment to transmit uplink information by using the uplink resource includes:

the second transmitter is specifically configured to instruct each user equipment to transmit uplink information by using the uplink resource allocated to each user equipment.

In an eighth implementation of the first aspect of this application, that a first transmitter is configured to send an uplink resource configuration request to a macro base station includes:

the first transmitter is specifically configured to: send a configuration request for requesting a first uplink resource to the macro base station when a quantity of users under coverage of the base station is a first value; and send a configuration request for requesting a second uplink resource to the macro base station when the quantity of users under coverage of the base station is a second value; where bandwidth of the first uplink resource is greater than bandwidth of the second uplink resource when the first value is greater than the second value, and the bandwidth of the first uplink resource is less than the bandwidth of the second uplink resource when the first information is less than the second value.

A second aspect of this application provides a macro base station, including:

a second receiver, configured to receive an uplink resource configuration request sent by a micro base station; and a third transmitter, configured to send an uplink resource configuration indication to the micro base station according to the uplink resource configuration request, where the uplink resource configuration indication is used to allocate an uplink resource to the micro base station, and the uplink resource is used by user equipment to transmit uplink information to the micro base station.

In a first implementation of the second aspect of this application, that a third transmitter is configured to send an uplink resource configuration indication to the micro base station includes:

the third transmitter is specifically configured to send the uplink resource configuration indication to the micro base station, where the uplink resource configuration indication includes a start frame number of the uplink resource and a subframe number of the uplink resource.

In a second implementation of the second aspect of this application, that a third transmitter is configured to send an uplink resource configuration indication to the micro base station includes:

the third transmitter is specifically configured to send the uplink resource configuration indication to the micro base station, where the uplink resource configuration indication includes the start frame number of the uplink resource, the subframe number of the uplink resource, a symbol position, and a frequency domain physical resource block PRB position.

In a third implementation of the second aspect of this application, the second receiver is further configured to receive an uplink information quality parameter transmitted by the micro base station;

a second processor is configured to determine quality of the uplink information according to the uplink information quality parameter; and the third transmitter is further configured to send an uplink resource change message to the micro base station when it is determined that the quality of the uplink information is poor according to the uplink information quality parameter, where the uplink resource change message carries a changed uplink resource indication.

A third aspect of this application provides an uplink transmission control method, including:

sending, by a micro base station, an uplink resource configuration request to a macro base station;

receiving, by the micro base station, an uplink resource configuration indication sent by the macro base station, where the uplink resource configuration indication is used to allocate an uplink resource to the micro base station; and instructing, by the micro base station, user equipment to transmit uplink information by using the uplink resource.

In a first implementation of the third aspect of this application, the instructing, by the micro base station, user equipment to transmit uplink information by using the uplink resource includes:

sending, by the micro base station, downlink information to the user equipment, where the downlink information carries indication information of the uplink resource.

In a second implementation of the third aspect of this application, the instructing, by the micro base station, user equipment to transmit uplink information by using the uplink resource includes:

broadcasting, by the micro base station, indication information of the uplink resource to the user equipment.

In a third implementation of the third aspect of this application, the indication information of the uplink resource includes:

a MAC layer command, where the MAC layer command carries video information of the uplink resource and a type of the uplink information, and the type of the uplink information includes a hybrid automatic repeat request HARQ feedback, a channel quality indicator CQI, or a precoding matrix index PMI.

In a fourth implementation of the third aspect of this application, after the instructing, by the micro base station, user equipment to transmit uplink information by using the uplink resource, the method further includes:

sending, by the micro base station, an uplink information quality parameter to the macro base station when the micro base station determines that quality of the received uplink information transmitted by the user equipment is poor, so that the macro base station reallocates an uplink resource to the micro base station; and receiving, by the micro base station, an uplink resource change message sent by the macro base station.

In a fifth implementation of the third aspect of this application, after the receiving, by the micro base station, an uplink resource configuration indication sent by the macro base station, the method further includes:

sending, by the micro base station, an uplink resource configuration acknowledgement message to the macro base station; and after the receiving, by the micro base station, an uplink resource change message sent by the macro base station, the method further includes:

sending, by the micro base station, an uplink resource configuration change acknowledgement message to the macro base station.

In a sixth implementation of the third aspect of this application, before the instructing, by the micro base station, user equipment to transmit uplink information by using the uplink resource, the method further includes:

allocating, by the micro base station, the uplink resource to each user equipment if there are multiple user equipments; and the instructing, by the micro base station, user equipment to transmit uplink information by using the uplink resource includes:

instructing, by the micro base station, each user equipment to transmit uplink information by using the uplink resource allocated to each user equipment.

In a seventh implementation of the third aspect of this application, that the sending, by a micro base station, an uplink resource configuration request to a macro base station includes:

sending, by the micro base station, a configuration request for requesting a first uplink resource to the macro base station when a quantity of users under coverage of the micro base station is a first value; and sending, by the micro base station, a configuration request for requesting a second uplink resource to the macro base station when the quantity of users under coverage of the micro base station is a second value; where bandwidth of the first uplink resource is greater than bandwidth of the second uplink resource when the first value is greater than the second value, and the bandwidth of the first uplink resource is less than the bandwidth of the second uplink resource when the first information is less than the second value.

A fourth aspect of this application provides an uplink transmission control method, including:

receiving, by a macro base station, an uplink resource configuration request sent by a micro base station; and sending, by the macro base station, an uplink resource configuration indication to the micro base station according to the uplink resource configuration request, where the uplink resource configuration indication is used to allocate an uplink resource to the micro base station, and the uplink resource is used by user equipment to transmit uplink information to the micro base station.

In a first implementation of the fourth aspect of this application, the sending an uplink resource configuration indication to a micro base station includes:

sending the uplink resource configuration indication to the micro base station, where the uplink resource configuration indication includes a start frame number of the uplink resource, a subframe number of the uplink resource, a symbol position, and a frequency domain physical resource block PRB position.

In a second implementation of the fourth aspect of this application, the method further includes:

receiving an uplink information quality parameter sent by the micro base station; and sending an uplink resource change message to the micro base station when it is determined that quality of the uplink information is poor according to the uplink information quality parameter, where the uplink resource change message carries a changed uplink resource indication.

According to the uplink transmission control method and the apparatus disclosed in the embodiments of this application, a micro base station sends an uplink resource configuration request to a macro base station, the macro base station sends, to the micro base station, an uplink resource configuration indication that is used to allocate an uplink resource to the micro base station, and then the micro base station instructs user equipment to transmit uplink information by using the uplink resource. It can be seen that, after the macro base station allocates the uplink resource to the micro base station, the micro base station may use the uplink resource to receive the uplink information transmitted by the user equipment. Therefore, when uplink transmission and downlink transmission are separated, if the micro base station needs to obtain a downlink feedback of the user equipment, the downlink feedback does not need to be forwarded by the macro base station. This can reduce a downlink feedback delay, and increase a throughput over an air interface.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
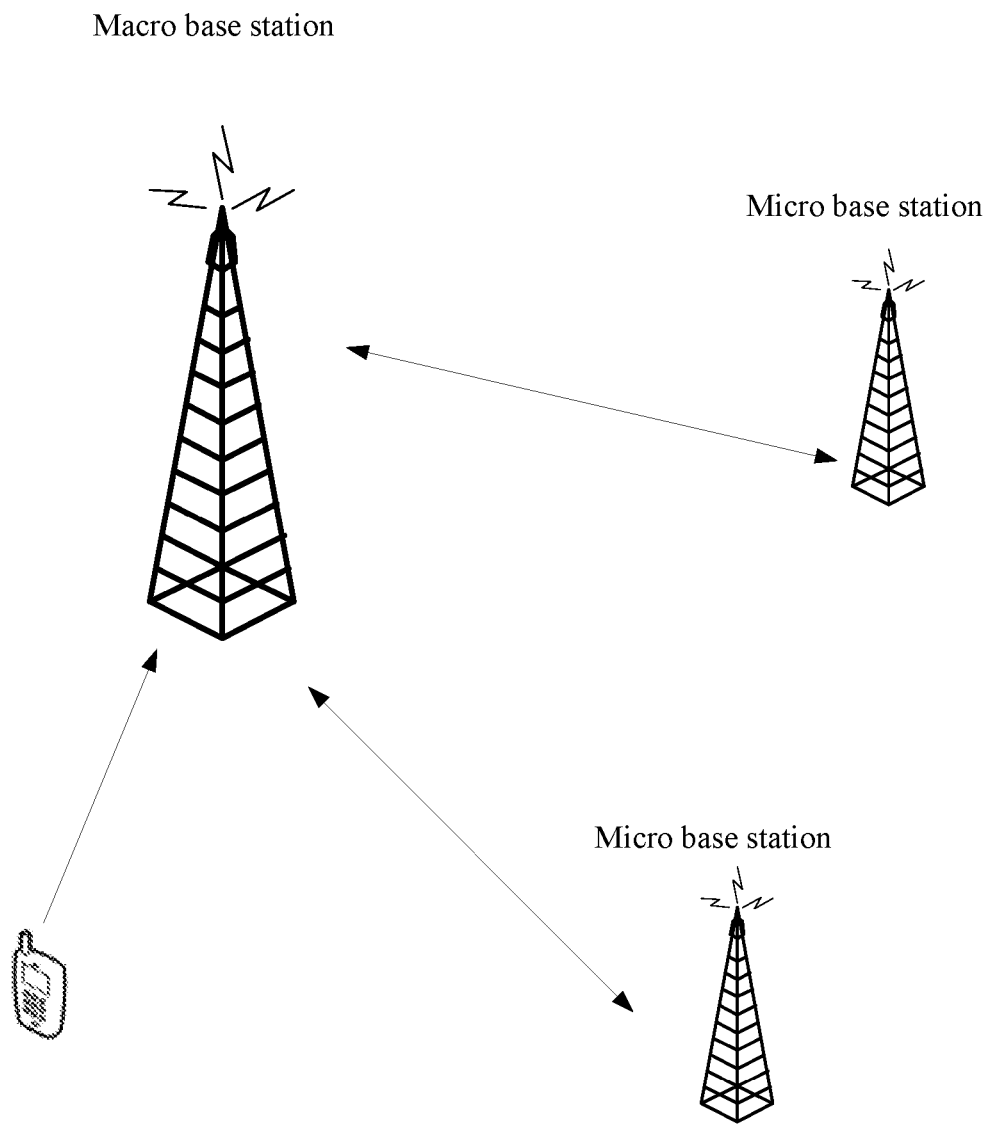
FIG. 1 is a schematic diagram of a macro base station and a micro base station in a scenario in which uplink transmission and downlink transmission are separated.

The embodiments of this application disclose a micro base station and a macro base station that can be applied in a scenario in which uplink transmission and downlink transmission are separated, as shown in FIG. 1. The micro base station may be, but is not limited to, a high frequency base station. Specifically, the micro base station may be a base station that uses a millimeter wave to perform downlink communication. The macro base station can receive uplink data sent by user equipment. Generally, a macro base station is co-located with one of multiple micro base stations, and is deployed separately from the other micro base stations.

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

Figure 2:
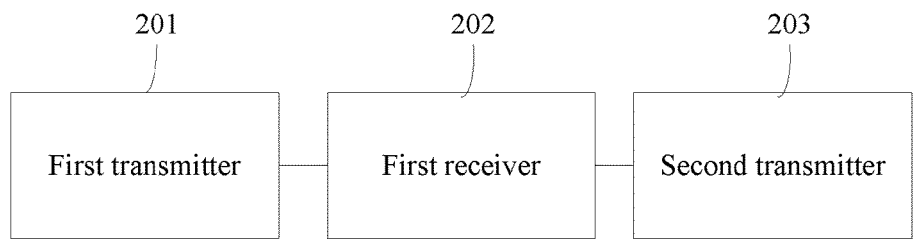
FIG. 2 is a schematic structural diagram of a micro base station disclosed in an embodiment of the present invention.

An embodiment of this application discloses a micro base station shown in FIG. 2, including a first transmitter 201, a first receiver 202, and a second transmitter 203.

The first transmitter 201 is configured to send an uplink resource configuration request to a macro base station, and optionally, may send the uplink resource configuration request to the macro base station when the micro base station is initialized. The first receiver 202 is configured to receive an uplink resource configuration indication sent by the macro base station. The uplink resource configuration indication is used to allocate an uplink resource to the micro base station. After the uplink resource configuration indication sent by the macro base station is received, the first transmitter is further configured to send an uplink resource configuration acknowledgement message to the macro base station. The second transmitter 203 is configured to instruct user equipment to transmit uplink information by using the uplink resource.

Further, optionally, a specific implementation in which the second transmitter 203 instructs the user equipment to transmit the uplink information by using the uplink resource may be: sending downlink information to the user equipment, where the downlink information carries indication information of the uplink resource; or broadcasting the indication information of the uplink resource to the user equipment, where further, the indication information of the uplink resource may be a MAC layer command, and the MAC layer command carries time-frequency information of the uplink resource and a type of the uplink information. Certainly, the indication information of the uplink resource may also be generated by a physical layer.

It should be noted that the type of the uplink information may be a hybrid automatic repeat request (HARM) feedback, a channel quality indicator (CQI), or a precoding matrix index (PMI). The purpose is to transmit, by using the allocated uplink resource, feedback information required in downlink communication of the micro base station to reduce a feedback delay, so as to improve downlink communication efficiency of the micro base station. Other uplink information can be first sent to the macro base station, and then forwarded by the macro base station to the micro base station.

The micro base station in this embodiment may actively request an uplink resource from a macro base station and instruct the user equipment to transmit uplink information by using the uplink resource allocated by the macro base station to the user. Therefore, in a scenario shown in FIG. 1, the micro base station may use a low frequency to receive a downlink feedback sent by the user equipment, so as to reduce a downlink feedback delay and increase a throughput over an air interface.

Figure 3:
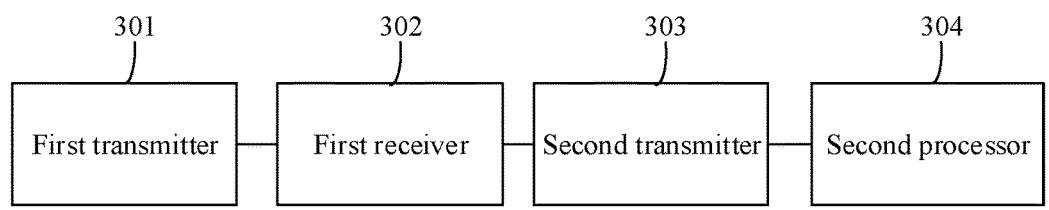
FIG. 3 is a schematic structural diagram of another micro base station disclosed in an embodiment of the present invention.

An embodiment of this application discloses another micro base station shown in FIG. 3, including a first transmitter 301, a first receiver 302, a second transmitter 303, and a first processor 304. In addition to having the functions described in the foregoing embodiment, in this embodiment, the first transmitter 301, the first receiver 302, and the second transmitter 303 also have other functions.

The first transmitter 301 may be further configured to: after the user equipment is instructed to transmit the uplink information by using the uplink resource, send an uplink information quality parameter to the macro base station when it is determined that quality of the uplink information transmitted by the user equipment is poor, so that the macro base station reallocates an uplink resource to the micro base station.

A condition for determining that the quality of the uplink information transmitted by the user equipment is poor may be: When a received CQI is lower than a threshold, it is determined that channel quality is relatively poor. The threshold is usually set by using an error rate.

The first receiver 302 may be further configured to receive an uplink resource change message sent by the macro base station.

The first transmitter 301 is further configured to send an uplink resource configuration change acknowledgement message to the macro base station after the uplink resource change message sent by the macro base station is received.

In this embodiment, the first processor 304 is configured to allocate an uplink resource to each user equipment when there are multiple user equipments. In this case, a specific implementation in which the second transmitter instructs the user equipment to transmit the uplink information by using the uplink resource may be: instructing each user equipment to transmit uplink information by using the uplink resource allocated to each user equipment. For a specific indication manner, reference may be made to the foregoing embodiment.

In addition, optionally, in this embodiment, a specific implementation in which the first transmitter 301 sends an uplink resource configuration request to the macro base station may be: sending a configuration request for requesting a first uplink resource to the macro base station when the quantity of users within coverage of the base station is a first value; and sending a configuration request for requesting a second uplink resource to the macro base station when the quantity of users under coverage of the base station is a second value. Bandwidth of the first uplink resource is greater than bandwidth of the second uplink resource when the first value is greater than the second value, and the bandwidth of the first uplink resource is less than the bandwidth of the second uplink resource when the first information is less than the second value.

When uplink information quality is not high, the micro base station disclosed in this embodiment may actively report the poor uplink information quality to the macro base station to request replacement of the uplink resource, and may request an uplink resource of corresponding bandwidth from the macro base station according to a quantity of user equipments under coverage of the micro base station. Therefore, a high-quality uplink transmission is achieved and uplink resource utilization is improved.

Figure 4:
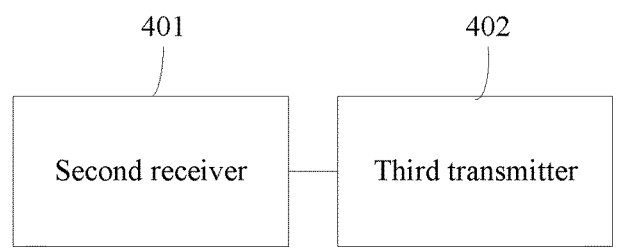
FIG. 4 is a schematic structural diagram of a macro base station disclosed in an embodiment of the present invention.

An embodiment of this application further discloses a macro base station shown in FIG. 4, including a second receiver 401 and a third transmitter 402.

The second receiver 401 is configured to receive an uplink resource configuration request sent by a micro base station. The third transmitter 402 is configured to send an uplink resource configuration indication to the micro base station according to the uplink resource configuration request. The uplink resource configuration indication is used to allocate an uplink resource to the micro base station, and the uplink resource is used to transmit uplink information by user equipment to the micro base station.

Optionally, in this embodiment, a specific implementation of in which the third transmitter 402 is configured to send an uplink resource configuration indication to the micro base station may be: sending the uplink resource configuration indication to the micro base station. The uplink resource configuration indication includes a start frame number of the uplink resource and a subframe number of the uplink resource. Further, the uplink resource configuration indication may further include a symbol position and a frequency domain physical resource block (PRB) position.

Figure 5:
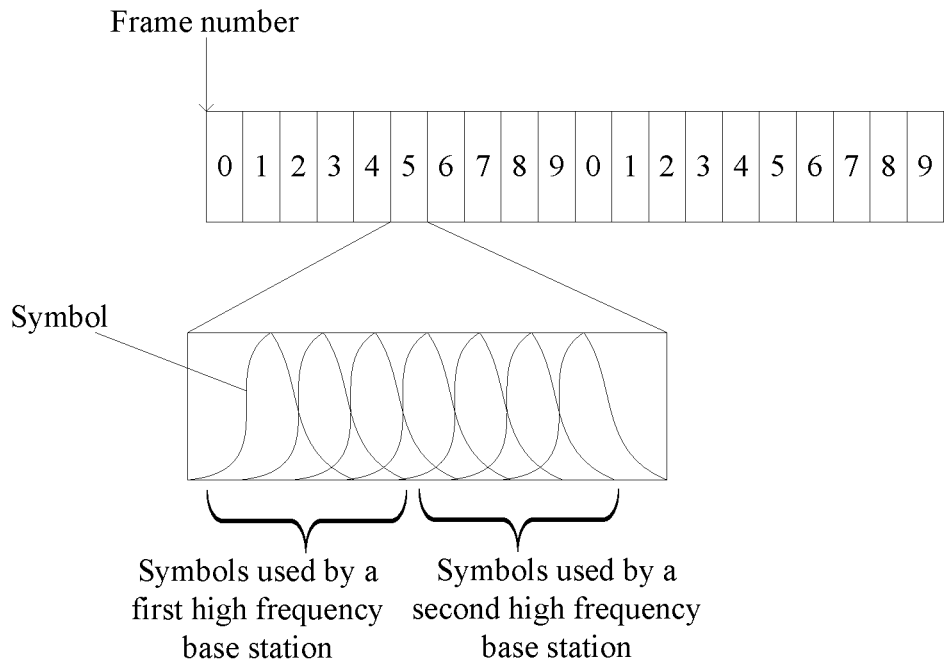
FIG. 5 is a schematic diagram of different symbols, in a same frame, that may be allocated separately to a first high frequency base station and a second high frequency base station by a macro base station disclosed in an embodiment of the present invention.

Symbol position allocation may achieve a purpose of allocating different symbols of one time slot to multiple micro base stations so as to improve resource utilization. As shown in FIG. 5, the macro base station may allocate different symbols of one frame separately to a first high frequency base station and a second high frequency base station. Therefore, one frame can be allocated to two high frequency base stations. In a scenario in which uplink transmission and downlink transmission are separated, that is, the micro base station uses a high frequency to send downlink data and the macro base station uses a low frequency to receive uplink data, utilization of low frequency resources is increased because there are relatively few low frequency resources.

Optionally, in this embodiment, the second receiver 401 may be further configured to receive an uplink information quality parameter sent by the micro base station. In this case, the macro base station in this embodiment may further include a second processor 403, configured to determine quality of the uplink information according to the uplink information quality parameter. The third transmitter 402 may be further configured to send an uplink resource change message to the micro base station when it is determined, according to the uplink information quality parameter, that the quality of the uplink information is poor. The uplink resource change message carries a changed uplink resource indication.

When a micro base station is a high frequency base station, the macro base station in this embodiment may allocate a low frequency uplink resource to the micro base station, so that the micro base station can directly receive a low frequency downlink feedback sent by a user. This reduces a downlink feedback delay and improves communication efficiency of the micro base station. In addition, the macro base station in this embodiment can replace the uplink resource for the micro base station when uplink information quality is not high, thereby improving communication quality of the micro base station.

Figure 6:
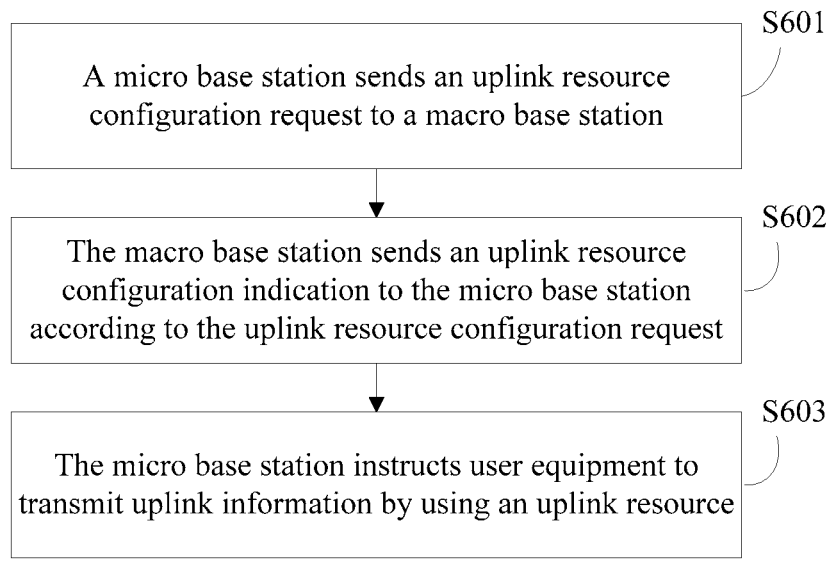
FIG. 6 is a flowchart of an uplink transmission control method disclosed in an embodiment of the present invention.

An embodiment of this application further discloses an uplink transmission control method. The method can be used to describe a specific procedure for completing uplink transmission control by means of interaction between a micro base station and a macro base station that are described in the foregoing embodiments. As shown in FIG. 6, the method specifically includes the following steps.

S601: The micro base station sends an uplink resource configuration request to the macro base station.

S602: The macro base station sends an uplink resource configuration indication to the micro base station according to the uplink resource configuration request.

The uplink resource configuration indication is used to allocate an uplink resource to the micro base station, and the uplink resource is used to transmit uplink information by user equipment to the micro base station.

S603: The micro base station instructs user equipment to transmit uplink information by using the uplink resource.

According to the method in this embodiment, a micro base station can directly receive a downlink feedback sent by user equipment, thereby increasing a downlink communication throughput of the micro base station.

The following describes in detail the method shown in FIG. 6 by using a scenario that includes a high frequency base station and a macro base station and in which uplink transmission and downlink transmission are separated as an example.

Figure 7:
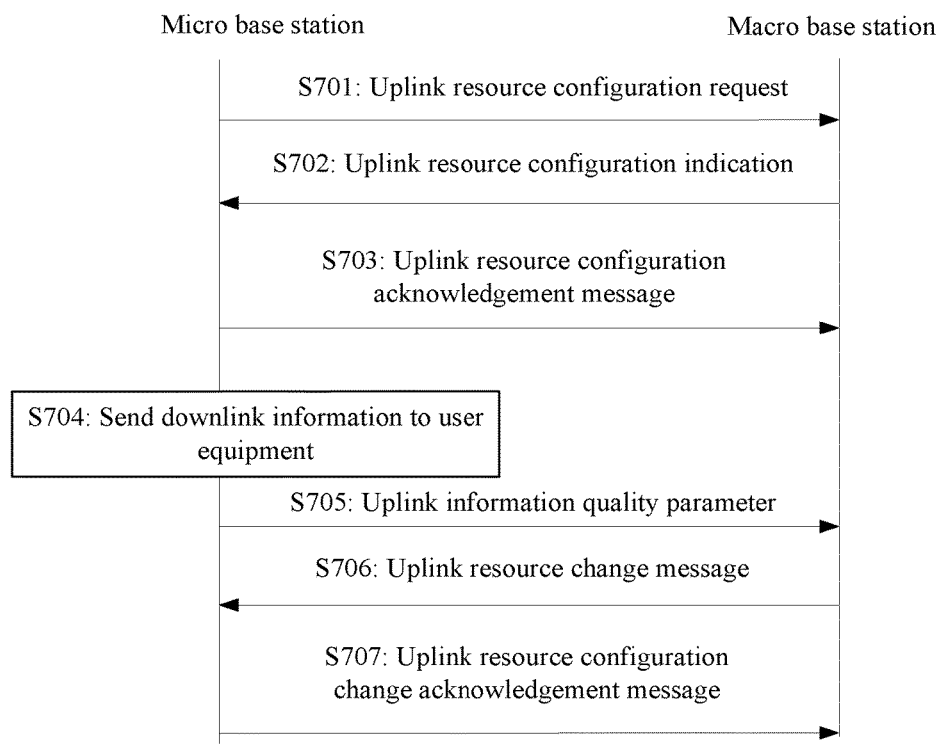
FIG. 7 is a flowchart of another uplink transmission control method disclosed in an embodiment of the present invention.

As shown in FIG. 7, another uplink transmission control method disclosed in an embodiment of this application includes the following steps.

S701: The micro base station sends an uplink resource configuration request to the macro base station.

Specifically, the micro base station sends a configuration request for requesting a first uplink resource to the macro base station when a quantity of users under coverage of the micro base station is a first value. The micro base station sends a configuration request for requesting a second uplink resource to the macro base station when the quantity of users under coverage of the micro base station is a second value. Bandwidth of the first uplink resource is greater than bandwidth of the second uplink resource when the first value is greater than the second value, and the bandwidth of the first uplink resource is less than the bandwidth of the second uplink resource when the first information is less than the second value.

S702: The macro base station sends an uplink resource configuration indication to the micro base station, where the uplink resource configuration indication includes a start frame number of an uplink resource, a subframe number of the uplink resource, a symbol position, and a frequency domain physical resource block PRB position.

S703: The micro base station sends an uplink resource configuration acknowledgement message to the macro base station.

S704: The micro base station sends downlink information to user equipment, where the downlink information carries indication information of the uplink resource.

Alternatively, the micro base station may also broadcast the indication information of the uplink resource to the user equipment.

The indication information of the uplink resource includes a MAC layer command. The MAC layer command carries video information of the uplink resource and a type of the uplink information. The type of the uplink information includes a hybrid automatic repeat request HARQ feedback, a channel quality indicator CQI, or a precoding matrix index PMI.

When there are multiple user equipments, the micro base station first allocates the uplink resource to each user equipment, and instructs each user equipment to transmit uplink information by using the uplink resource allocated to each user equipment.

S705: The micro base station sends an uplink information quality parameter to the macro base station when the micro base station determines that quality of the received uplink information transmitted by the user equipment is poor.

S706: The macro base station sends an uplink resource change message to the micro base station when determining, according to the uplink information quality parameter, that the quality of the uplink information is poor, where the uplink resource change message carries a changed uplink resource indication.

S707: The micro base station sends an uplink resource configuration change acknowledgement message to the macro base station.

According to the method disclosed in this embodiment, when uplink information quality is not high, a micro base station may actively report the poor uplink information quality to the macro base station to request replacement of an uplink resource, and may request an uplink resource of corresponding bandwidth from the macro base station according to a quantity of user equipments under coverage of the micro base station. Therefore, a high-quality uplink transmission is achieved and uplink resource utilization is improved.

If the functions of the method in the embodiment are implemented in the form of a software functional unit and sold or used as an independent product, the functions may be stored in a computing device-readable storage medium. Based on such an understanding, the part of the embodiments of the present invention contributing to the prior art or some of the technical solutions may be implemented in a form of a software product. The software product is stored in a storage medium, and includes several instructions for instructing a computing device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The embodiments in this specification are all described in a progressive manner, for same or similar parts in the embodiments, reference may be made to these embodiments, and each embodiment focuses on a difference from other embodiments.

The embodiments disclosed above are described to enable a person skilled in the art to implement or use the present invention. Various modifications to the embodiments are obvious to the person skilled in the art, and general principles defined in this specification may be implemented in other embodiments without departing from the spirit or scope of the present invention. Therefore, the present invention is not intended to be limited to these embodiments illustrated in this specification, but shall be construed in the widest scope consistent with the principles and novel features disclosed in this specification.

What is claimed is:

1. A micro base station comprising:
a processor;
a first transmitter configured to cooperate with the processor to send an uplink resource configuration request to a macro base station;
a receiver configured to cooperate with the processor to receive an uplink resource configuration indication sent by the macro base station, wherein the uplink resource configuration indication is used to allocate an uplink resource to the micro base station; and
a second transmitter configured to cooperate with the processor to instruct user equipment (UE) to transmit uplink information by using the uplink resource, and send downlink information to the UE,
  wherein the downlink information carries indication information of the uplink resource and the indication information comprises a media access control (MAC) layer command that carries time-frequency information of the uplink resource and a type of the uplink information, and the type of the uplink information comprises: a hybrid automatic repeat request (HARQ) feedback, a channel quality indicator (CQI), or a precoding matrix index (PMI).

2. The micro base station according to claim 1, wherein when instructing the user equipment to transmit the uplink information by using the uplink resource, the second transmitter is further configured to cooperate with the processor to broadcast indication information of the uplink resource to the user equipment.

3. The micro base station according to claim 1, wherein the first transmitter is further configured to cooperate with the processor to:
after the user equipment is instructed to transmit the uplink information by using the uplink resource, send an uplink information quality parameter to the macro base station when it is determined that quality of the uplink information transmitted by the user equipment is poor, so that the macro base station reallocates another uplink resource to the micro base station; and
the receiver is further configured to cooperate with the processor to receive an uplink resource change message sent by the macro base station.

4. The micro base station according to claim 1, wherein the first transmitter is further configured to cooperate with the processor to:
send an uplink resource configuration acknowledgement message to the macro base station after the uplink resource configuration indication sent by the macro base station is received; and send an uplink resource configuration change acknowledgement message to the macro base station after the uplink resource change message sent by the macro base station is received.

5. The micro base station according to claim 1, wherein processor is configured to allocate the uplink resource to each user equipment when there are multiple user equipments;
wherein when instructing the user equipment to transmit the uplink information by using the uplink resource, the second transmitter is further configured to cooperate with the processor to instruct each of the multiple user equipments to transmit uplink information of each of the multiple user equipments by using the uplink resource allocated to each of the multiple user equipments.

6. The micro base station according to claim 1, wherein when sending the uplink resource configuration request to the macro base station, the first transmitter is configured to cooperate with the processor to:
send a configuration request for requesting a first uplink resource to the macro base station when a quantity of users under coverage of the base station is a first value; and
send a configuration request for requesting a second uplink resource to the macro base station when the quantity of users under coverage of the base station is a second value,
  wherein bandwidth of the first uplink resource is greater than bandwidth of the second uplink resource when the first value is greater than the second value, and the bandwidth of the first uplink resource is less than the bandwidth of the second uplink resource when the first value is less than the second value.

7. A macro base station comprising:
a processor;
a receiver configured to cooperate with the processor to receive an uplink resource configuration request sent by a micro base station; and
a transmitter configured to cooperate with the processor to send an uplink resource configuration indication to the micro base station according to the uplink resource configuration request,
  wherein the uplink resource configuration indication is used by the macro base station to allocate an uplink resource to the micro base station, and the uplink resource is used by a user equipment (UE) to transmit uplink information to the micro base station according to information provided to the UE describing the uplink resource, including information about a media access control (MAC) layer command that carries time-frequency of the uplink resource and a type of the uplink information comprising one of (a) a hybrid automatic repeat request (HARQ) feedback, (b) a channel quality indicator (CQI) or (c) a precoding matrix index (PMI).

8. The macro base station according to claim 7, wherein the uplink resource configuration indication comprises a start frame number of the uplink resource and a subframe number of the uplink resource.

9. The macro base station according to claim 8, wherein the receiver is further configured to cooperate with the processor to receive the uplink information quality parameter sent by the micro base station;

the processor is configured to determine a quality of the uplink information according to the uplink information quality parameter; and the transmitter is further configured to cooperate with the processor to send an uplink resource change message to the micro base station when it is determined that the quality of the uplink information is poor according to the uplink information quality parameter, wherein the uplink resource change message carries a changed uplink resource indication.

10. The macro base station according to claim 7, wherein the uplink resource configuration indication comprises the start frame number of the uplink resource, the subframe number of the uplink resource, a symbol position, and a frequency domain physical resource block (PRB) position.

11. An uplink transmission control method comprising:
sending, by a micro base station, an uplink resource configuration request to a macro base station;
receiving, by the micro base station, an uplink resource configuration indication sent by the macro base station, wherein the uplink resource configuration indication is used to allocate an uplink resource to the micro base station; and
sending, by the micro base station, downlink information to the user equipment for instructing the user equipment to transmit uplink information by using the uplink resource,
wherein the downlink information carries information indicating the uplink resource and the indication information comprises a media access control (MAC) layer command that carries video information of the uplink resource and a type of the uplink information, and
wherein the type of the uplink information comprises a hybrid automatic repeat request (HARQ) feedback, a channel quality indicator (CQI), or a precoding matrix index (PMI).

12. The method according to claim 11, wherein instructing the user equipment to transmit the uplink information by using the uplink resource comprises broadcasting, by the micro base station, indication information of the uplink resource to the user equipment.

13. The method according to claim 11, wherein after the micro base station instructs the user equipment to transmit the uplink information by using the uplink resource, the method further comprises:
sending, by the micro base station, an uplink information quality parameter to the macro base station when the micro base station determines that quality of the received uplink information transmitted by the user equipment is poor, so that the macro base station reallocates another uplink resource to the micro base station; and
receiving, by the micro base station, an uplink resource change message sent by the macro base station.

14. The method according to claim 11, wherein after the micro base station receives the uplink resource configuration indication sent by the macro base station, the method further comprises:
sending, by the micro base station, an uplink resource configuration acknowledgement message to the macro base station; and
after the micro base station receives the uplink resource change message sent by the macro base station, the method further comprises:
sending, by the micro base station, an uplink resource configuration change acknowledgement message to the macro base station.

15. An uplink transmission control method comprising:
receiving, by a macro base station, an uplink resource configuration request sent by a micro base station; and
sending, by the macro base station, an uplink resource configuration indication to the micro base station according to the uplink resource configuration request,
wherein the uplink resource configuration indication is used by the macro base station to allocate an uplink resource to the micro base station, and the uplink resource is used by a user equipment (UE) to transmit uplink information to the micro base station according to information provided to the UE describing the uplink resource, including information about a media access control (MAC) layer command that carries time-frequency of the uplink resource and a type of the uplink information comprising one of (a) a hybrid automatic repeat request (HARQ) feedback, (b) a channel quality indicator (CQI) or (c) a precoding matrix index (PMI).

16. The uplink transmission control method according to claim 15, wherein the uplink resource configuration indication comprises a start frame number of the uplink resource and a subframe number of the uplink resource.

17. The uplink transmission control method according to claim 15, wherein the uplink resource configuration indication comprises the start frame number of the uplink resource, the subframe number of the uplink resource, a symbol position, and a frequency domain physical resource block (PRB) position.

18. The uplink transmission control method according to claim 16, including
receiving the uplink information quality parameter sent by the micro base station;
determining a quality of the uplink information according to the uplink information quality parameter; and
sending an uplink resource change message to the micro base station when it is determined that the quality of the uplink information is poor according to the uplink information quality parameter,
wherein the uplink resource change message carries a changed uplink resource indication.

* * * * *